United States Patent
Beutel

(10) Patent No.: US 8,298,714 B2
(45) Date of Patent: Oct. 30, 2012

(54) TUNNEL BRIDGE WITH ELASTOMERIC SEAL FOR A FUEL CELL STACK REPEATING UNIT

(75) Inventor: Matthew J. Beutel, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1162 days.

(21) Appl. No.: 12/057,831

(22) Filed: Mar. 28, 2008

(65) Prior Publication Data

US 2009/0246599 A1    Oct. 1, 2009

(51) Int. Cl.
*H01M 2/14* (2006.01)
*H01M 8/04* (2006.01)

(52) U.S. Cl. ......... 429/456; 429/463; 429/508; 429/509

(58) Field of Classification Search .................. 429/30, 429/35, 452, 454, 456, 457, 471, 507, 508, 429/509, 510
See application file for complete search history.

(56) References Cited

U.S. PATENT DOCUMENTS

| | | | |
|---|---|---|---|
| 6,261,711 B1 * | 7/2001 | Matlock et al. | 429/513 |
| 6,500,580 B1 * | 12/2002 | Marvin et al. | 429/457 |
| 6,524,735 B1 * | 2/2003 | Wariishi et al. | 429/434 |
| 2001/0019790 A1 * | 9/2001 | Regan et al. | 429/35 |
| 2005/0214620 A1 | 9/2005 | Cho et al. | |
| 2006/0172170 A1 * | 8/2006 | Cho et al. | 429/33 |

FOREIGN PATENT DOCUMENTS

CN    1674332    9/2005

* cited by examiner

*Primary Examiner* — Basia Ridley
*Assistant Examiner* — James Lee
(74) *Attorney, Agent, or Firm* — Harness, Dickey & Pierce, P.L.C.

(57) ABSTRACT

A PEM fuel cell includes a first plate having a flow field for directing a first fluid along a surface thereof. A second plate includes a flow field for directing a second fluid along a surface thereof. A seal is disposed between the first plate and the second plate. The seal includes a plate margin defining a header aperture for delivering the first fluid to the first plate. The seal defines a carrier having a first side supported by the flow field of the first plate whereby the first fluid is permitted to flow directly from the first header aperture to the flow field of the first plate. The carrier includes a gasket arranged on a second side. The gasket precludes the first fluid from flowing directly from the header aperture to the flow field of the second plate.

19 Claims, 5 Drawing Sheets

TUNNEL BRIDGE WITH ELASTOMERIC SEAL FOR A FUEL CELL STACK REPEATING UNIT

FIELD OF THE INVENTION

The present invention relates to PEM fuel cells and more particularly to a seal configuration incorporated within a fuel cell stack.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluorinated sulfonic acid. The anode/cathode typically comprises finely divided catalytic particles, which are often supported on carbon particles, and mixed with a proton conductive resin. The catalytic particles are typically costly precious metal particles. As such these MEAs are relatively expensive to manufacture and require certain conditions, including proper water management and humidification and control of catalyst fouling constituents such as carbon monoxide (CO), for effective operation.

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

Typically, nonconductive gaskets or seals provide a seal and electrical insulation between the several plates of the fuel cell stack. In addition, the seals provide a flow path for the gaseous reactants from the supply header to the surfaces of the respective anode and cathode catalysts. Conventionally, the seals comprise a molded compliant material such as rubber. In one application, it is necessary to provide ports formed through the plates of the stack for directing gaseous reactants and coolant respectively from the supply header to the appropriate flow fields. In addition to, or in place of the ports, bridge insert pieces may be employed to provide a tunnel for communicating the reactants from the supply header to the appropriate flow field.

SUMMARY OF THE INVENTION

A PEM fuel cell includes a first plate having a flow field for directing a first fluid along a surface thereof. A second plate includes a flow field for directing a second fluid along a surface thereof. A seal is disposed between the first plate and the second plate. The seal includes a plate margin defining a header aperture for delivering the first fluid to the first plate. The seal defines a carrier having a first side supported by the flow field of the first plate whereby the first fluid is permitted to flow directly from the first header aperture to the flow field of the first plate. The carrier includes a gasket arranged on a second side. The gasket precludes the first fluid from flowing directly from the header aperture to the flow field of the second plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
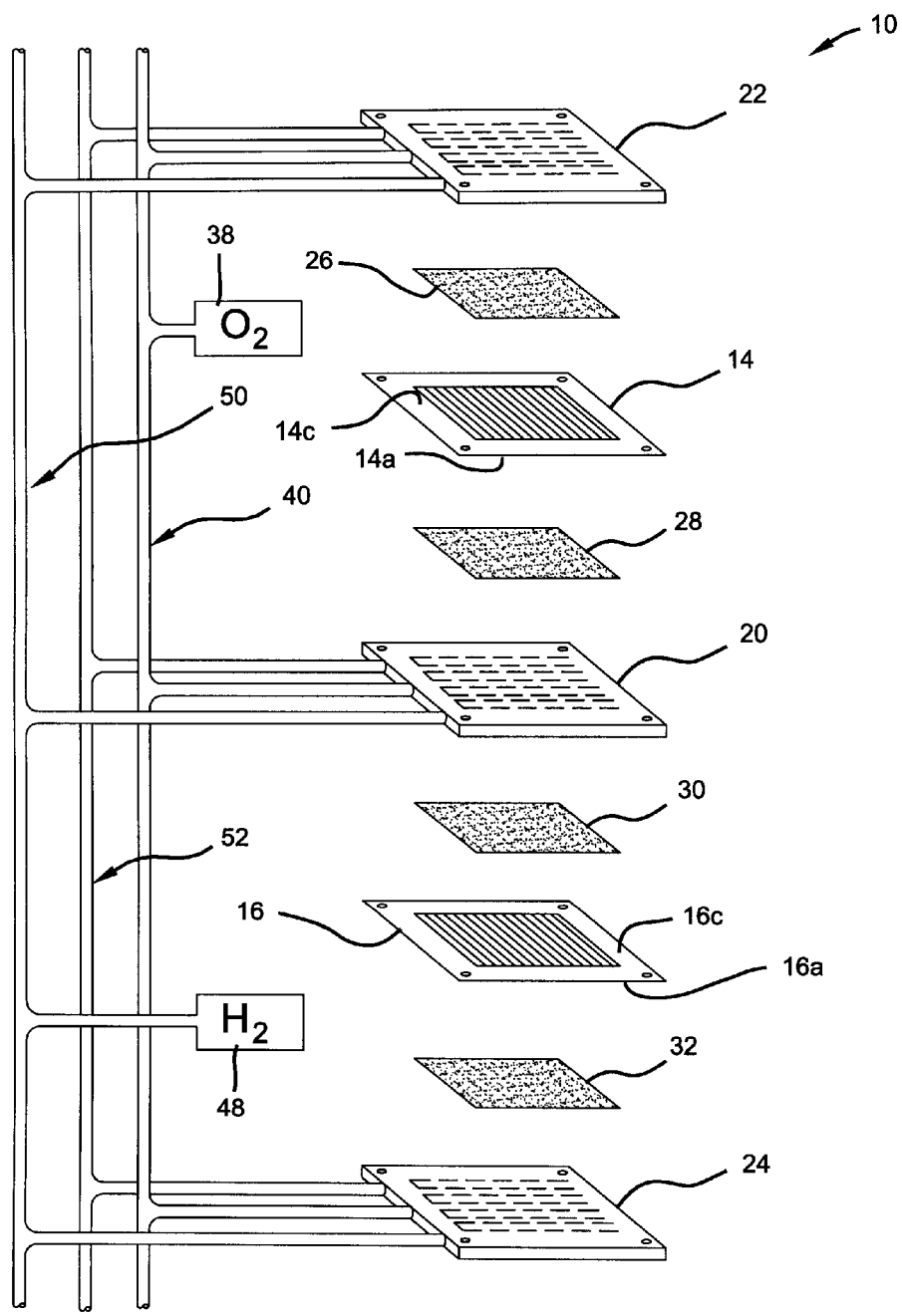
FIG. 1 is a schematic isometric exploded illustration of a PEM fuel cell stack.

FIG. 1 schematically depicts a partial PEM fuel cell stack 10 having membrane-electrode-assemblies (MEAs) 14, 16 separated from each other by a non-porous, electrically-conductive bipolar plate 20. The MEAs 14 and 16 and bipolar plate 20 are stacked together between non-porous, electrically-conductive, bipolar plates 22 and 24. Porous, gas permeable, electrically conductive sheets or diffusion media 26, 28, 30 and 32 press up against the electrode faces of the MEAs 14 and 16 and may serve as primary current collectors for the electrodes. The diffusion media 26, 28, 30 and 32 also provide mechanical supports for the MEAs 14 and 16, especially at locations where the MEAs are otherwise unsupported in the flow field. Suitable diffusion media include carbon/graphite paper/cloth, fine mesh noble metal screens, open cell noble metal foams, and the like which conduct current from the electrodes while allowing gas to pass therethrough.

Bipolar plates 22 and 24 press up against the primary current collector 26 on the cathode face 14c of the MEA 14 and the primary current collector 32 on the anode face 16a of the MEA 16. The bipolar plate 20 presses up against the primary current collector 28 on the anode face 14a of the MEA 14 and against the primary current collector 30 on the cathode face 16c of the MEA 16. An oxidant gas such as oxygen or air is supplied to the cathode side of the fuel cell stack 10 from a storage tank 38 via appropriate supply plumbing 40. Similarly, a fuel such as hydrogen is supplied to the anode side of the fuel cell stack 10 from a storage tank 48 via appropriate plumbing 50.

In a preferred embodiment, the oxygen tank 38 may be eliminated, and air supplied to the cathode side from the ambient. Likewise, the hydrogen tank 48 may be eliminated and hydrogen supplied to the anode side from a reformer which catalytically generates hydrogen from methanol or a liquid hydrocarbon (e.g., gasoline). Exhaust plumbing 52 for the $H_2$ and $O_2$ air sides of the MEAs is also provided for removing $H_2$ depleted anode gas from the anode flow field and $O_2$ depleted cathode gas from the cathode flow field. Although the exhaust plumbing 52 is shown as a single pipe, it is appreciated that a distinct pipe may be provided for exhausting each gas.

Figure 2:
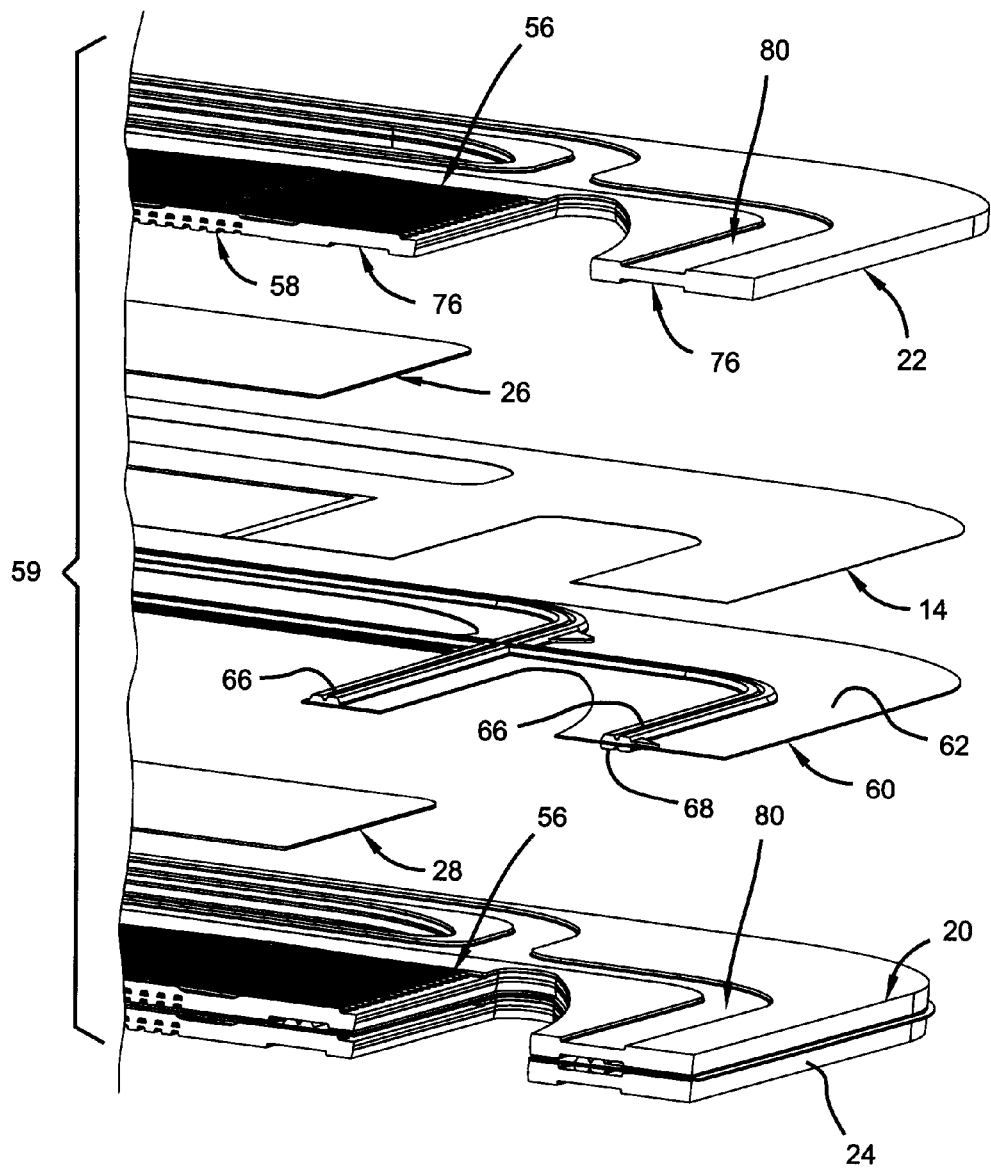
FIG. 2 is an exploded view of a portion of the PEM fuel cell stack of FIG. 1.

With reference now to FIGS. 1-4, the bipolar plates 20, and 22 according to the present invention will be described in greater detail. The bipolar plates 20 and 22 are configured to carry a cathode reactant gas across a flow field 56 formed on a first surface and an anode reactant gas across a flow field 58 formed on a second surface. FIG. 2 represents a partial exploded portion 59. In the partial exploded portion 59 of FIG. 2, the flow field 56 of the bipolar plate 20 communicates a cathode reactant gas to the cathode face of the MEA 14. Similarly, the flow field 58 of the bipolar plate 22 communicates an anode reactant gas to the anode face of the MEA 14. While each bipolar plate 20, 22 and 24 are illustrated as a unitary sheet having flow fields 56 and 58 arranged on opposite faces, it is appreciated that the bipolar plates may each comprise two separator plates lying in a back to back orientation.

Figure 3:
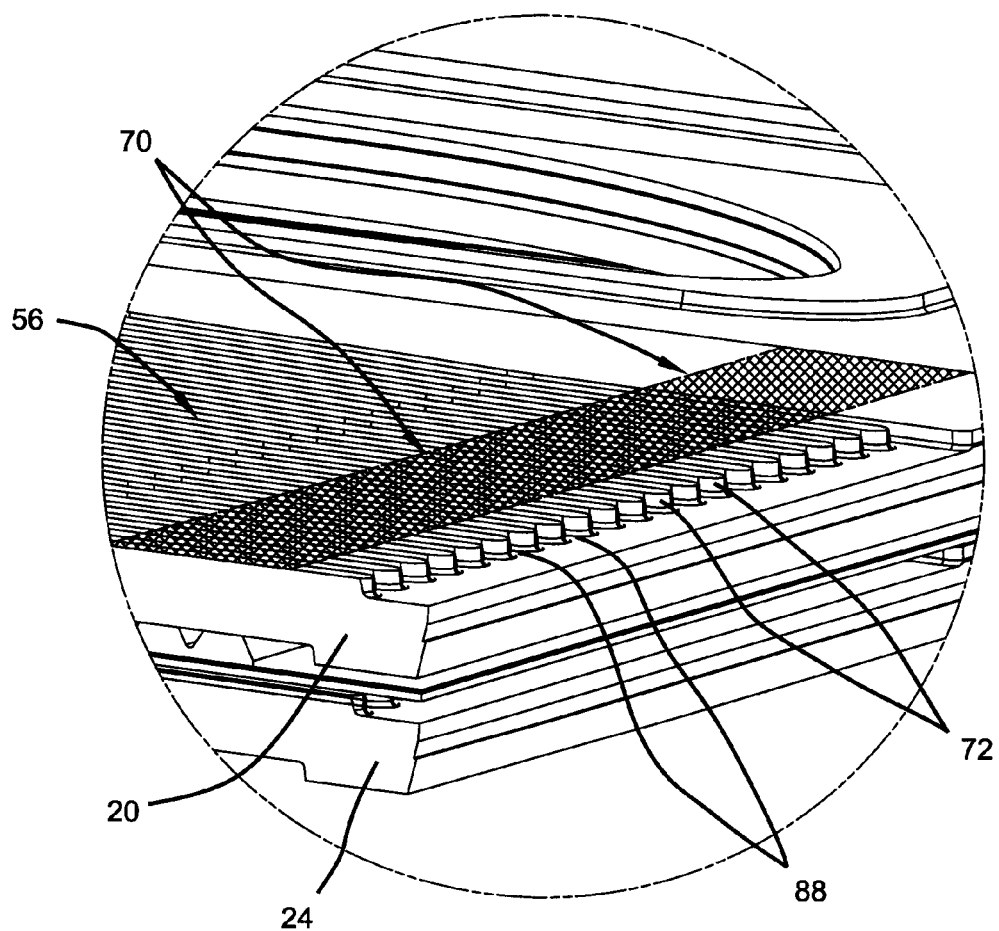
FIG. 3 is a detailed assembled view of the PEM fuel cell stack of FIG. 2.

With specific reference now to FIGS. 2-4, a seal 60 according to the present teachings will be described in greater detail. The seal 60 generally comprises a carrier 62 (FIG. 2) having a first elastomeric gasket 66 formed on a first side and a second elastomeric gasket 68 formed on a second side. The elastomeric gasket 68 on the second side is configured to seal all areas except for a bridge area 70 (FIG. 3). The bridge area 70, while represented as a meshed area for illustrative purposes, is identified to represent an area across lands 72 of the flow field 56 near an inlet aperture 74. The bridge area 70 is operable to communicate cathode reactant from the inlet header aperture 74 (FIG. 4) directly to the cathode flow field 56.

The seal 60 is operable to provide a sealing function for respective streams of the stack (anode, cathode and coolant). The anode side of the gasket 66 (upper side as viewed from FIG. 2) is forced against the MEA 14 which in turn is forced against a first receiving channel 76 formed on the anode side of the bipolar plate 22. The cathode side of the gasket 68 (lower side as viewed from FIG. 2) is forced against a second receiving channel 80 formed on the cathode side of the bipolar plate 20. As a result in the stack as a whole, a seal is formed around the inlet and outlet apertures of the fluid headers (all not specifically shown) and around the active area on the anode side of each MEA.

Figure 4:
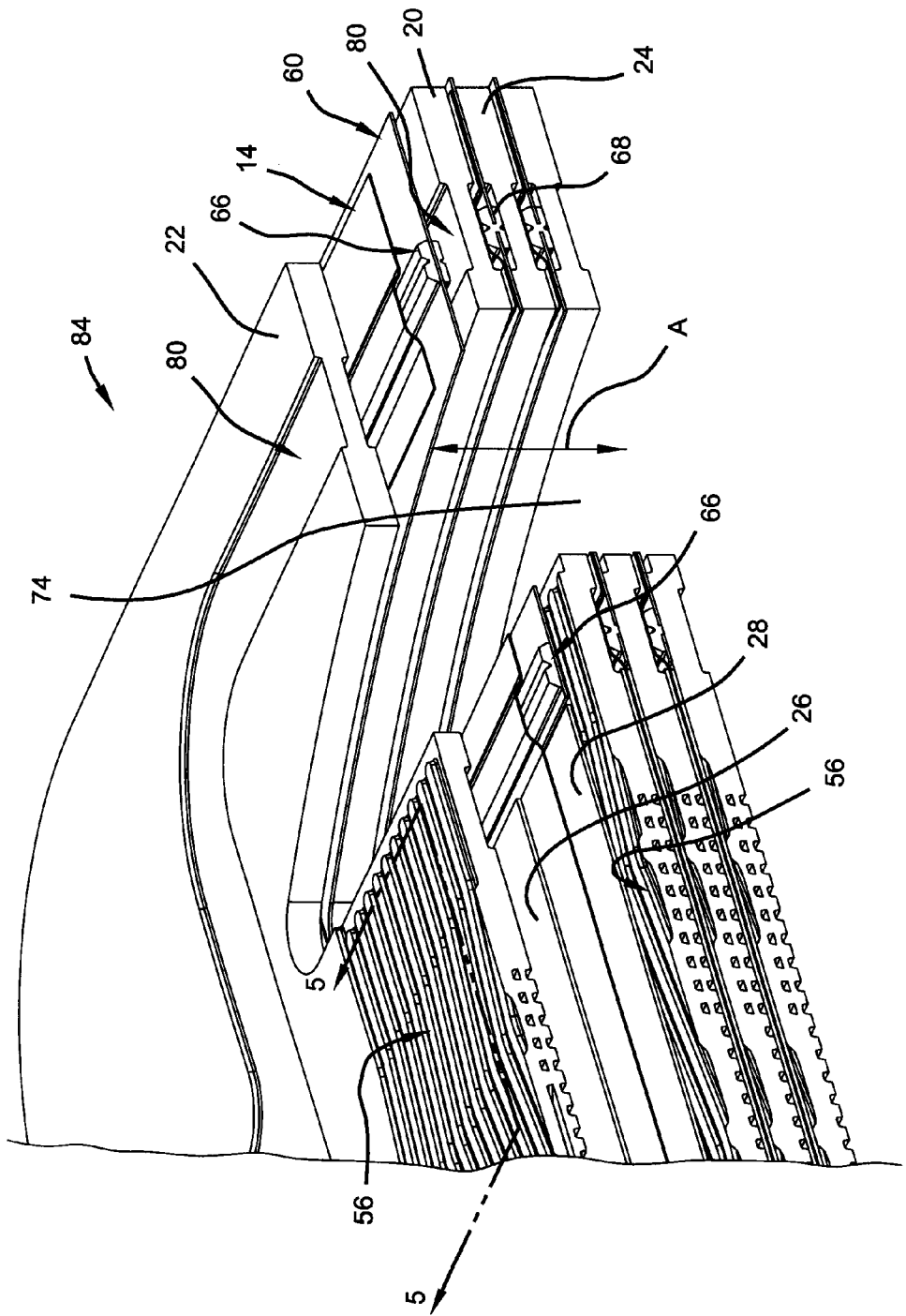
FIG. 4 is a partial sectional view of an assembled PEM fuel cell stack of FIG. 2.

Referring specifically now to FIG. 4, an inlet plate margin 84 will be described. In an assembled position, the supply header aperture 74 is defined around the inlet plate margin 84 by the respective bipolar plates 20, 22 and 24, MEAs 14 and seals 60. The supply header aperture 74 is specifically configured to carry a cathode reactant gas in a flow direction identified generally in a vertical direction A. While not shown, it is appreciated that an anode supply header aperture is similarly formed near the outer edge of the inlet plate margin 84. Likewise, a complementary series of exhaust header apertures are formed on an outlet plate margin (not specifically shown) at an opposite end of the supply header.

The construction of the seal 60 will now be described in greater detail. The carrier 62 generally comprises a polymeric film or substrate such as polyimide or polyester. Suitable materials include Kapton® (polyimide) and Mylar® (polyester) both manufactured by the E.I. DuPont Corporation. The polymeric substrate is molded with an elastomeric material forming the gasket. While the gasket (66, 68) is shown molded as a double bead cross section (FIG. 5), any suitable dimension may be employed. It is appreciated that these materials are merely exemplary and other materials may be similarly employed. For example, the carrier 62 may alternatively comprise a metallic material or a mixture of a polymeric and metallic material.

Figure 5:
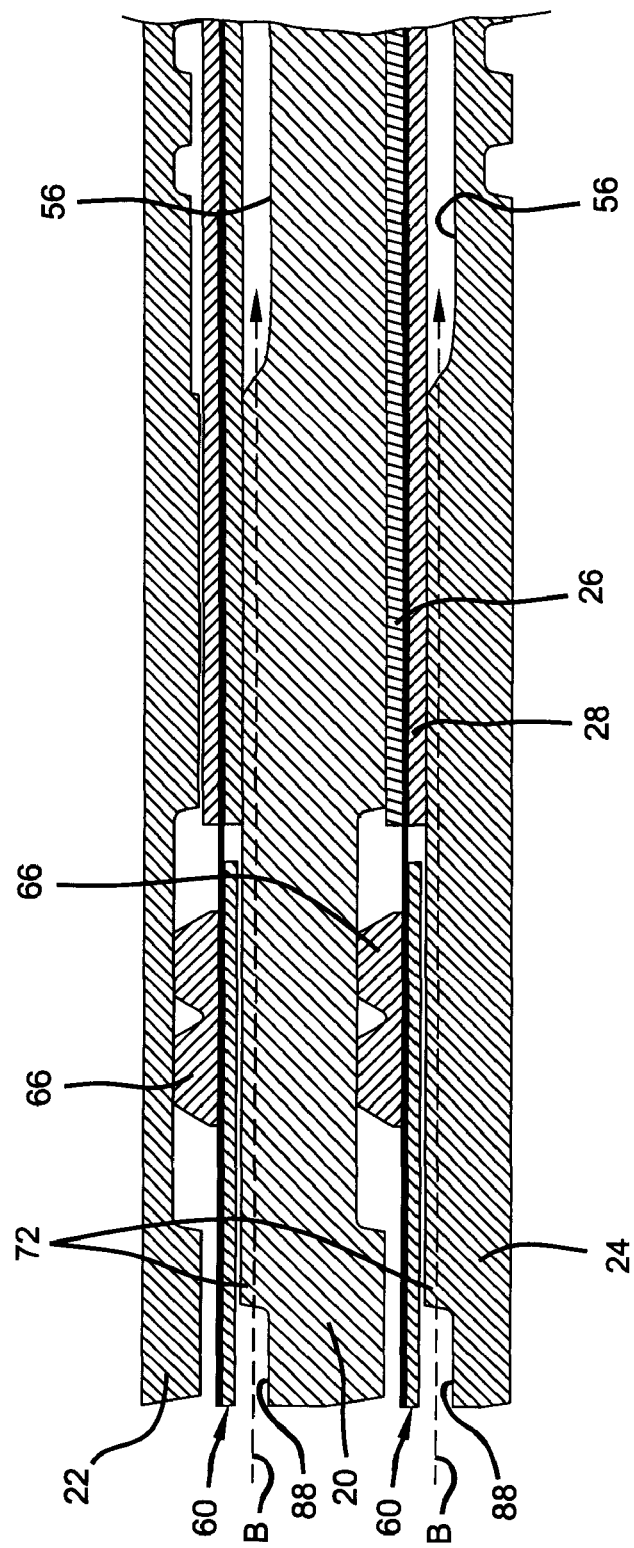
FIG. 5 is a sectional view of the PEM fuel cell stack taken along line 5-5 of FIG. 4.

With specific reference now to FIGS. 4 and 5, the flow path of the cathode reactant gas will be described. In general, the seal 60 allows the cathode reactant to consist of two distinct flow segments. Specifically, the first flow segment A is defined in a generally vertical direction by the cathode inlet aperture 74 (FIG. 4). The second flow segment B is defined in a generally horizontal direction defined by the cathode flow field 56. As best illustrated in FIG. 5, the elastomeric gasket 68 molded to the carrier 62 of the seal 60 is absent at an entrance area 88 defined on an inboard portion of the inlet header aperture 74. As a result, direct fluid communication is permitted from the header aperture 74 to the flow field 56. While not specifically shown, it is appreciated that the same configuration is provided with respect to the exhaust header aperture. As a result, water removal is facilitated from the cathode flow field 56 to the exhaust header aperture.

Those skilled in the art can now appreciate from the foregoing description that the broad teachings of the present invention can be implemented in a variety of forms. For example, it is appreciated that while the discussion above has been directed to provide a seal configured to support cathode bridging, the seal may alternatively be configured to provide anode bridging. Furthermore, the flow fields 56 and 58 are merely exemplary and other flow fields may be employed for cooperating with the seal 60. Therefore, while this invention has been described in connection with particular examples thereof, the true scope of the invention should not be so limited since other modifications will become apparent to the skilled practitioner upon a study of the drawings, the specification and the following claims.

What is claimed is:

1. A PEM fuel cell comprising:
   a first plate having a flow field for directing a first fluid along a surface thereof;
   a second plate having a flow field for directing a second fluid along a surface thereof; and
   a membrane electrode assembly and a seal disposed between said first plate and said second plate, said seal having a plate margin defining a first header aperture for delivering said first fluid to said first plate, said seal defining a carrier having a first side supported by said flow field of said first plate whereby said first fluid is permitted to flow directly from said first header aperture to said flow field of said first plate, said carrier having a gasket arranged on a second side, said gasket pressing against said membrane electrode assembly precluding said first fluid from flowing directly from said header aperture to said flow field of said second plate.

2. The PEM fuel cell of claim 1 wherein said second plate defines a channel proximate said header aperture for accepting said gasket thereat.

3. The PEM fuel cell of claim 1 wherein said flow field of said first plate defines a plurality of lands defining passages between adjacent lands for accepting said first fluid from said header aperture.

4. The PEM fuel cell of claim 1 wherein said first plate defines a plate margin having a channel formed outboard said header aperture for accepting a gasket formed on said first side of said carrier.

5. The PEM fuel cell of claim 1 wherein a flow path of said first fluid from said header aperture to said flow field of said first plate is defined entirely by two distinct flow segments consisting of:
   a first flow segment through said header aperture defining a first direction; and
   a second flow segment from said header aperture along said surface of said first plate defining a second direction.

6. The PEM fuel cell of claim 5 wherein said first direction and said second direction are substantially perpendicular.

7. The PEM fuel cell of claim 1 wherein said carrier is planar.

8. The PEM fuel cell of claim 7 wherein said carrier is selected from the group consisting of: polymers, metals and combinations thereof.

9. The PEM fuel cell of claim 7 wherein said carrier comprises a polymer selected from the group consisting of: polyimides, polyesters and mixtures thereof.

10. The PEM fuel cell of claim 1 wherein said gasket is elastomeric and molded onto said carrier.

11. The PEM fuel cell of claim 1 wherein said first plate is a cathode plate and said second plate is an anode plate.

12. A PEM fuel cell having a first inlet header aperture and a second inlet header aperture for delivering a first and second fluid, respectively, to the PEM fuel cell comprising:
   a first plate having a flow field for directing the first fluid along a surface thereof;
   a second plate having a flow field for directing the second fluid along a surface thereof; and
   a membrane electrode assembly and a seal disposed between said first plate and said second plate, said seal having a first side pressing against said first plate and allowing passage of the first fluid from the first inlet header aperture between said seal and said first plate to the flow field of the first plate, said seal having a second side for pressing against said membrane electrode assembly, pressing said membrane electrode assembly in turn against said second plate and precluding passage of the first fluid to said second plate.

13. The PEM fuel cell of claim 12 wherein said seal defines a carrier, said carrier having a first side pressing against said first plate, and a second side having a gasket formed thereon for pressing said membrane electrode assembly against said second plate.

14. The PEM fuel cell of claim 12 wherein said first side of said seal presses against said flow field of said first plate.

15. The PEM fuel cell of claim 12 wherein a flow path of said first fluid from said first header aperture to said flow field of said first plate is defined entirely by two distinct flow segments consisting of:
   a first flow segment through said first header aperture defining a first direction; and
   a second flow segment from said first header aperture along said surface of said first plate defining a second direction.

16. A PEM fuel cell having an inlet header aperture for delivering a first fluid, the PEM fuel cell comprising:
   a first plate having a flow field for directing the first fluid along a surface thereof;
   a second plate having a flow field for directing a second fluid along a surface thereof; and
   a polymeric film defining a plane and disposed between said first plate and said second plate and a membrane electrode assembly disposed between said first plate and said second plate, said film having a first side pressing against and supported by said flow field defined on said first plate, said film allowing passage of the first fluid between said film and said first plate in a direction lateral to said plane from the inlet header aperture to the flow field of the first plate, said film having a second side pressing against said membrane electrode assembly.

17. The PEM fuel cell of claim 16 wherein said first plate defines a plate margin having a channel formed outboard said header aperture for accepting a gasket formed on said first side of said carrier.

18. The PEM fuel cell of claim 16 wherein a flow path of said first fluid from said header aperture to said flow field of said first plate is defined entirely by two distinct flow segments consisting of
   a first flow segment through said header aperture defining a first direction; and
   a second flow segment from said header aperture along said surface of said first plate defining a second direction.

19. The PEM fuel cell of claim 18 wherein said first direction and said second direction are substantially perpendicular.

* * * * *